US006295532B1

(12) United States Patent
Hawkinson

(10) Patent No.: US 6,295,532 B1
(45) Date of Patent: *Sep. 25, 2001

(54) APPARATUS AND METHOD FOR CLASSIFYING INFORMATION RECEIVED BY A COMMUNICATIONS SYSTEM

(75) Inventor: Christopher D. Hawkinson, Buena Park, CA (US)

(73) Assignee: NMS Communications Corporation, Framingham, MA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/261,061

(22) Filed: Mar. 2, 1999

(51) Int. Cl.[7] .................................................. G06F 17/30
(52) U.S. Cl. ............................. 707/4; 2/4; 2/10; 2/102; 2/103; 2/200; 2/205
(58) Field of Search ........................... 707/2, 4, 10, 102, 707/103, 200, 205; 709/223, 224, 235, 226, 239, 240, 241, 249; 712/2, 4; 370/255, 256, 352

(56) References Cited

U.S. PATENT DOCUMENTS

| 5,287,498 | * | 2/1994 | Perelman et al. ...................... 707/10 |
| 5,664,172 | * | 9/1997 | Antoshenkov ........................... 707/4 |
| 5,852,822 | * | 12/1998 | Srinivasan et al. ....................... 707/4 |
| 6,092,115 | * | 7/2000 | Choudhury et al. ................. 709/235 |

OTHER PUBLICATIONS (IEEE publication) Efficient adaptive media scaling and streaming of layered multimedia in heterogeneous environment by Wei Zhao, Dept. of Computer Science, University of Maryland, College Park, MD. paper in Multimedia Computing and Systems, pp. 377–381, Jun. 1999.*

(List continued on next page.)

Primary Examiner—Thomas Black
Assistant Examiner—Diane D. Mizrahi
(74) Attorney, Agent, or Firm—Irell & Manella LLP

(57) ABSTRACT

The present invention involves a system and method for classifying information received by a communications device. A first parameter having a first parameter range and a second parameter range, and a second parameter having a third parameter range and a fourth parameter range, are defined. A first class having one of the first parameter and the second parameter ranges, and one of the third and the fourth parameter ranges, are also defined. A second class having another one of the first parameter and the second parameter ranges, and another one of the third and the fourth parameter ranges, is also defined. Information having a first parameter value and a second parameter value is received. The method determines if the first parameter value is within one of the first and second parameter ranges and if the second parameter value is within one of the third and fourth parameter ranges is made. If so, the information is classified into one of the first and second classes based on the first parameter value and the second parameter value, otherwise the information is classified as a default class. An output value representative of the classification is then generated.

21 Claims, 7 Drawing Sheets

OTHER PUBLICATIONS (IEEE publication) "Packet Classification using Hierarchical intelligent cuttings" by Gupta et al., Computer Systems Lab., Stanford University, Stanford, CA., pp. 34–41, Feb. 2000.*

Subhash Suri et al., Leap Forward Virtual Clock: A New Fair Queuing Scheme with Guaranteed Delays and Throughput Fairness, Washington University, Department of Computer Science, Oct. 27, 1997, 1–35.

"Fast and Scalable Layer Four Switching", V. Srinivasan et al., Computer Communications Review, Oct. 1998.

"Small Forwarding Tables for Fast Routing Lookups", Mikael Degermark et al., Department of Computer Science and Electrical Engineering, Computer Communications Review, 10/98.

"Leap Forward Virtual Clock", S. Suri et al, A New Fair Queing Scheme w/Guarantted Delays & Throughput Fairness, Washington Univ., Dept. of Computer Science Oct. 27, 1997, 1–35.

"Practical Algorithm to Retrieve Information Coded in Alfanumeric," Journal of the ACM, Oct. 1968.

* cited by examiner

= CLASS 1 (SOURCE IP 192.1.1.1 TO 200.1.5.255, DEST IP 192.1.1.1 TO 255.255.255.255)

= CLASS 2 (SOURCE IP 192.1.1.1 TO 200.1.5.255, DEST IP 200.1.5.1 TO 200.1.5.255)

= CLASS 3 (SOURCE IP 192.1.1.1 TO 192.1.1.255, DEST IP 192.1.1.1 TO 192.1.1.255)

RESULTING RANGES:

$SR_0$ = 0.0.0.0 TO 192.1.1.0
$SR_1$ = 192.1.1.1 TO 192.1.1.255
$SR_2$ = 192.1.2.0 TO 200.1.5.255
$SR_3$ = 192.1.6.0 TO 255.255.255.255

$DR_0$ = 0.0.0.0 TO 192.1.1.0
$DR_1$ = 192.1.1.1 TO 192.1.1.255
$DR_2$ = 192.1.2.0 TO 200.1.5.0
$DR_3$ = 200.1.5.1 TO 200.1.5.255
$DR_4$ = 200.1.6.0 TO 255.255.255.255

APPARATUS AND METHOD FOR CLASSIFYING INFORMATION RECEIVED BY A COMMUNICATIONS SYSTEM

BACKGROUND OF THE INVENTION

1. Field of the Invention

The present invention relates generally to communication devices, and specifically, to an apparatus and method for classifying information received by communications devices.

2. Background Information

Small and medium businesses typically have networks comprised of local area networks ("LANs"), ranging between 10 Mega bits per second ("Mbps") to 100 Mbps, that carry information between stations for a wide range of applications. The applications can include a mixture of voice, video, interactive, web browsing, file transfers, etc., each of which has different minimum requirements for latency, jitter, and data loss to ensure quality communication. The internal office LANs can either provide sufficient bandwidth or are economically upgradable to provide an order of magnitude increase in bandwidth.

The connection to a wide area network ("WAN") is however another matter. The bandwidth is not easily upgradable due to the cost of WAN access circuits. Various queuing techniques have been employed in WAN access equipment in attempts to provide sharing of the limited circuit bandwidth among the different types of data. These queuing techniques typically have limited applications and undesirable characteristics. For example, in one queuing technique, queues are serviced in strict priority order, which tends to starve low priority data types. Another technique, called Weighted Fair Queuing, solves the starvation effects but it is computational intensive and does not provide guaranteed bandwidth, delay bound or jitter bound characteristics for data types that need these characteristics.

In implementing such queuing techniques, incoming data must first been identified and thereafter, classified for queuing allocation. Current routers, which provide some form of classification system, do so by combining search technologies previously used for routing table lookups. These technologies rely on algorithms such as the Patricia tree (as described by Don Morrison in "Practical Algorithm to Retrieve Information Coded In Alfanumeric," Journal of the ACM, October 1968), or the Lulea tree (as described by Mikael Degermark of the Lulea University of Technology in "Small Forwarding Tables for Fast Routing Lookups," Computer Communications Review, October 1998), search algorithms to perform lookup operations of various portions of the internet protocol (IP) header. The results from these searches are combined in some fashion (e.g., using Cross Product tables or arrays, as described by V. Srinivasan of Washington University in "Fast and Scalable Layer Four Switching," Computer Communications Review, October 1998) and used to formulate a "class" for the incoming data.

Existing routing search algorithms are used to handling definitions of the form "Address A=route n". To apply an existing routing search technique for searching and classifying data in ranges, "n" individual search steps have to be used. This results in excess data storage space requirements, and additional processing requirements when handling classification ranges.

Since the number of possible resulting combinations can be immense, the problem of translating the search results to a "class" is not trivial. Traditional approaches use either a simple array or something like a Cross Product table (as described by V. Srinivasan of Washington University in "Fast and Scalable Layer Four Switching," Computer Communications Review, October 1998.

Simple arrays, although fast, require memory to hold every possible combination, so are impractical except for the simplest cases. The problem associated with using Cross Product tables to locate the final "class" results is that the most recently accessed results must be cached in the Cross Product table. Basically, the results from each individual search are combined by an expression similar to "finalResult=((((((result1 * maxResult1)+result2) * maxResult2)+result3) * maxResult3)+result4) * maxResult4)+result5". The final "cross product" value is searched for in the "key" column of the Cross Product table, using a binary search. If the value is found, the correspond "result" column entry is returned as the "class" value. If not found, which is more likely to be the case due to the large range of possible values, a exhaustive search of the available classes must be done. The found "class" and the "cross product" value are both added to the "Cross Product" table. Although a Cross Product table does minimize the amount of memory required, processing requirements become non-deterministic.

Accordingly, there is a need in the technology for classifying incoming data received by a communications device that overcomes the aforementioned problems.

To classify incoming data, searches are typically performed to identify incoming data such as network frames or protocol data units. Traditional search methods either required each unique value to be explicitly stored in a search tree, or required an elaborate tree structure such as the use of a "grid of tries" to provide an efficient search. Since the search has to operate very quickly (typically less than one microsecond on the average), it is imperative to utilize the full capabilities of the processor in the communications device. For such traditional search techniques to operate efficiently, all data that has to be searched is typically stored in the processor's memory space. However, since the processor has only limited amounts of internal memory, the implementation of such traditional search techniques are not practicable.

Moreover, such in using such traditional search techniques, the average and worst case execution times do not remain deterministic beyond a small number of search values. These values are those that are located in the processor's memory space.

Accordingly, there is a need in the technology for an apparatus and method for identifying incoming data received by a communications device that overcomes the aforementioned problems.

SUMMARY OF THE INVENTION

The present invention involves a system and method for classifying information received by a communications device. A first parameter having a first parameter range and a second parameter range, and a second parameter having a third parameter range and a fourth parameter range, are defined. A first class having one of the first parameter and the second parameter ranges, and one of the third and the fourth parameter ranges, are also defined. A second class having another one of the first parameter and the second parameter ranges, and another one of the third and the fourth parameter ranges, is also defined. Information having a first parameter value and a second parameter value is received. The method determines if the first parameter value is within one of the first and second parameter ranges and if the second parameter value is within one of the third and fourth parameter ranges is made. If so, the information is classified into one of the first and second classes based on the first parameter value and the second parameter value, otherwise the information is classified as a default class. An output value representative of the classification is then generated.

DETAILED DESCRIPTION

The present invention thus provides a classification system and method by implementing an Axis Preprocessing classification technique in combination with a Binary Range Tree searching technique. The Binary Range Tree searching technique allows large ranges of contiguous values to be search using a minimal number of tree "nodes", while the Axis Preprocessing technique assures that the maximum number of contiguous ranges is generated in the final "class" search step.

Figure 1:
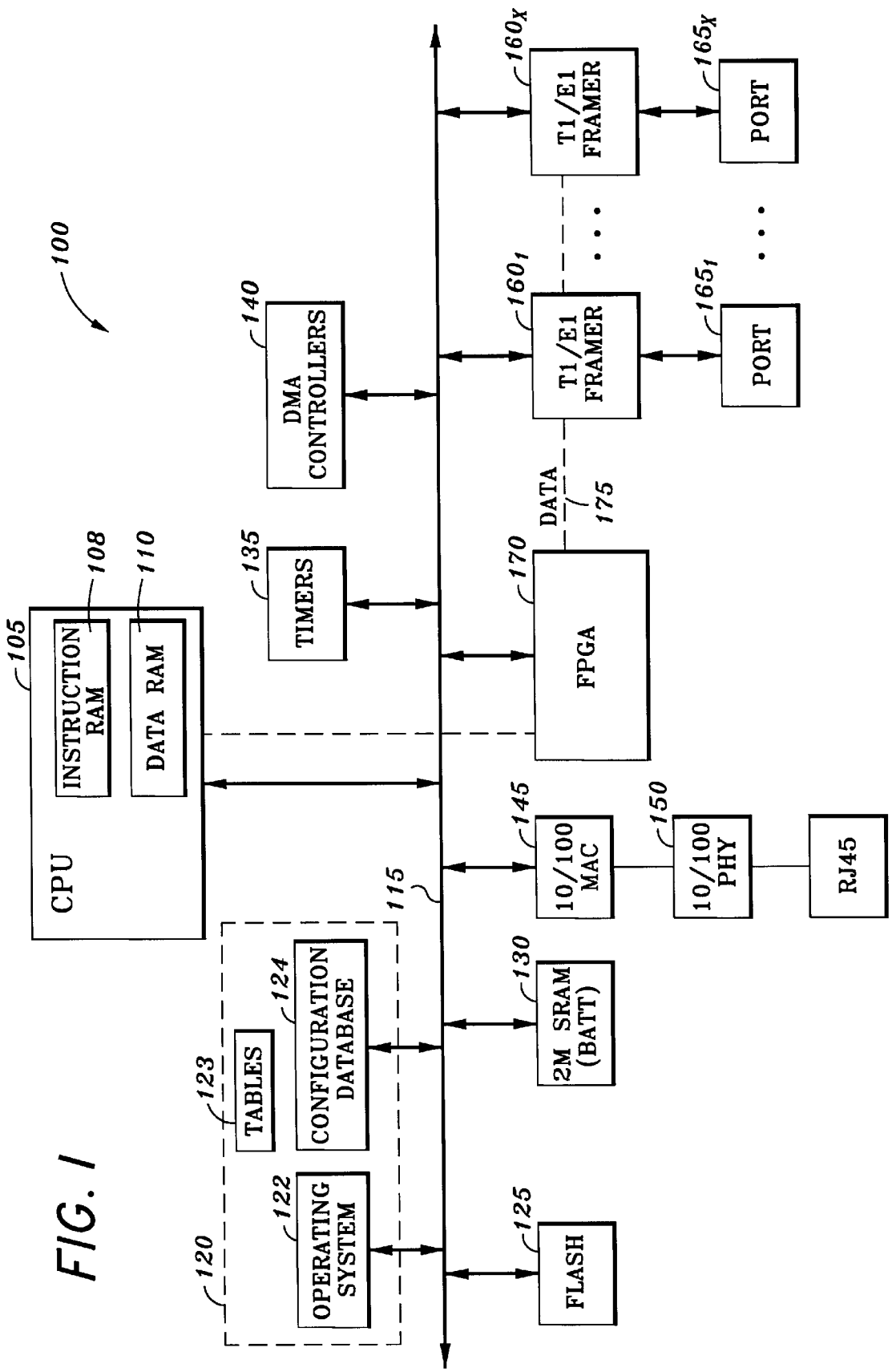
FIG. 1 illustrates an embodiment of a communication device suitable for use with embodiments of the present invention.

FIG. 1 illustrates an embodiment of a communication device 100 suitable for use with embodiments of the present invention. In one embodiment, the communication device 100 is a quality of service access communications device. Referring to FIG. 1, the communication device 100 includes a central processing unit ("CPU") 105 such as a microprocessor, microcontroller, or digital signal processor having on chip instruction and data memory 108 and 110 (e.g., static random access memory "SRAM"), which are cache-like devices. The CPU 105 gis coupled to a plurality of devices by way of a system bus 115. In particular, the CPU 105 is coupled to an external memory 120 (e.g., Synchronous Burst SRAM, Synchronous Dynamic RAM, etc., or a combination of such devices), a FLASH memory device 125 (e.g., 8 Mbytes) for downloading program information, and a battery backup SRAM 130 (e.g., 2 Mbytes).

In addition, a number of input/output ("I/O") devices are coupled to the bus 115, including an Ethernet media access control ("MAC") port 145 for receiving/transmitting data packets from/to a physical interface 150 and a plurality of T1/E1 framers $160_1$–$160_X$ (where "X" is a positive whole number) for receiving/transmitting asynchronous transfer mode ("ATM") cells and frames from/to respective I/O ports $165_1$–$165_X$. A field programmable gate array ("FPGA") 170 is coupled to the bus 115. The FPGA 170 is also coupled to the T1/E1 framers $160_1$–$160_X$ and the CPU 105 by way of a serial bus 175. The control path of the T1/E1 framers $160_1$–$160_X$ and the FPGA 170 is through the bus for configuring and reading status information from the devices. The data path (e.g., ATM cells, frames, etc.) to/from the ports is provided though the serial bus 175. That is, data received from a port is transmitted to the CPU 105 through the FPGA 170 by way of the serial bus 175, and data is transmitted to a port from the CPU 105, though the FPGA 170 by way of the serial bus 175.

Also coupled to the bus 115 are general purpose timers 135, which are used for generating periodic interrupts, and direct memory access ("DMA") controllers 140 for transferring data from memory to memory, from the Ethernet MAC port buffer to memory, etc.

When the communication device 100 is powered up, an operating system 122 is loaded into memory 120 and/or the instruction cache 108 from a non-volatile storage device (e.g., FLASH 125) or a mass storage device such as a hard disk drive (not shown). Also loaded into memory 120 and/or the data cache 110 is a configuration database 124 having configuration information on virtual path connections ("VPCs") and virtual circuit connections ("VCCs") established for each user network interface ("UNI"). Thus, a user or organization wanting to communicate over a wide area network ("WAN") will lease VPC and/or VCC services from a communication carrier. The communication carrier then establishes the VPC and/or VCC services for each UNI into the communication device 100.

A UNI is hereinafter used interchangeably with a port, with each port having one or more physical links. As discussed herein, a "data unit" refers to a packet, frame, or cell. A "flow" is defined as a uniquely identified stream of data units. Through inspection of data unit headers, the data units are categorized and classified to constitute a uniquely identified flow. In one embodiment, a flow is either a level-1 flow or a level-2 flow. Moreover, flows may be aggregated such that they are processed and managed as one aggregate flow. Thus, any reference to a flow refers to a flow or a flow aggregate. Processing and management of a flow includes allocating resources for the flow. Examples of resource allocation include link bandwidth allocation and node buffer allocation for a flow. An example of processing includes encapsulation of Internet Protocol ("IP") datagrams with ATM request for comment ("RFC") 1483 encapsulation, entitled "Multiprotocol Encapsulation over ATM Adaptation Layer 5", published in July 1993. A protocol or protocol layer is hereinafter defined as a protocol that can be mapped into the Open System Interconnection ("OSI") layer model.

Figure 2:
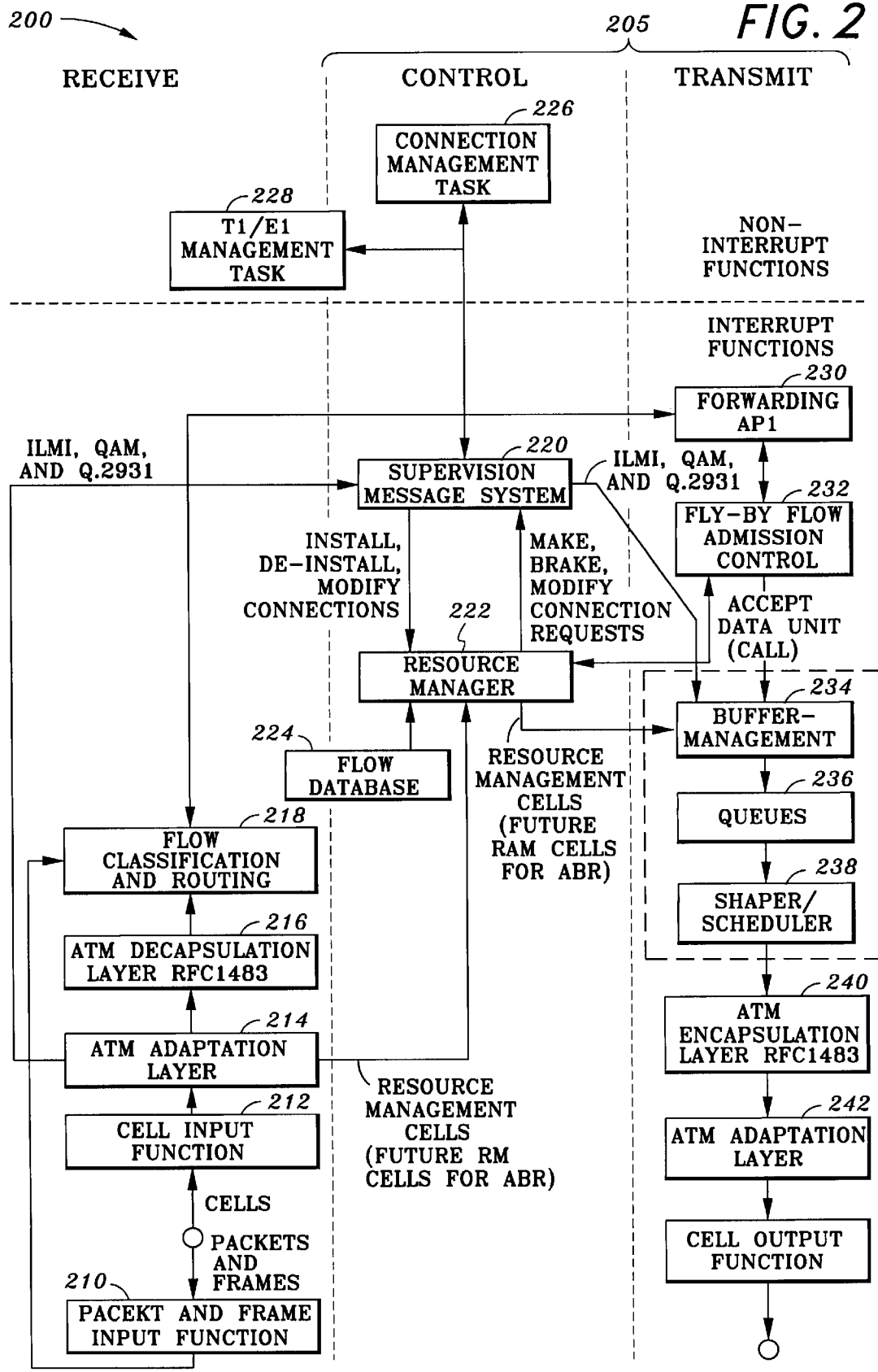
FIG. 2 illustrates functional blocks within a queuing module 200 according to one embodiment of the present invention.

FIG. 2 illustrates functional blocks within a queuing module 200 implemented on the communication device 100 according to one embodiment of the present invention. Referring to FIG. 2, the functional blocks are broken up into three vertical segments, namely, receive, control, and transmit, and two horizontal segments, namely non-interrupt and interrupt functions. In one embodiment, the queuing module 200 is implemented in software, in which case, the queuing module 200 or portions thereof is contained in the memory 120 and/or internal memory 108 of the CPU 105, and is executed by the CPU 105 (FIG. 1). For discussion purposes, the queuing module 200 is described as comprising a receive module, and a queue and transmit (QCT) module 205.

RECEIVE SEGMENT

In the receive segment, packets and frames such as, for example, IP packets, Ethernet frames, and frame relay frames are received by a packet/frame input function 210. The input function 210 performs preliminary filtering and cyclic redundancy checking ("CRC") on the packets and frames. The packets and frames are then forwarded to a flow classification and routing block 218.

ATM cells are received by a cell input function 212. The cell input function 212 determines whether there is an existing connection for the cell stream. The cells are then passed to an adaptation layer processing block 214 where the cells are converted to contiguous protocol data units ("PDUs") using, for example, ATM adaptation layer 5 ("AAL5"). The adaptation layer processing block 214 also detects Integrated Local Management Interface ("ILMI"), Operations, Administration, and Maintenance ("OAM"), and signaling cells, and passes them directly to a supervision message system block 220 for setting up/tearing down connections, etc. In addition, the adaptation layer processing block 214 detects resource management cells relating to flow control (e.g., ATM available bit rate "ABR" RM cells, etc.), and passes these cells to a resource manager block 222 which then slows down or speeds up an existing flow in response to the management cells. After each PDU is reconstructed, it is passed to an ATM decapsulation layer block 216 where PDUs are decapsulated into data units using RFC 1483. The ATM decapsulation layer block 216 then forwards the data units to the flow classification and routing block 218.

The flow classification and routing block 218 determines whether a flow has been set up for an incoming data unit, and determines the class of traffic that the flow is assigned. If a flow has been set up for the packet, the packet and an associated Flow ID are transmitted to a forwarding block 230 in the transmit segment. The Flow ID includes several components including a destination link, the shaping/scheduling parameters of the flow, the quality of service ("QoS") parameters assigned to the flow, etc. Assignment of the Flow ID is dependent on the classification of the flow. The class assigned to the flow determines the QoS to be provided for that flow. In one embodiment, the Flow ID is an address pointing to a memory location where the aforementioned parameters are located. If a flow has not been assigned to the packet, the packet is sent to the forwarding block 230 with a request that a flow be created for the packet at a desired QoS. Details of the flow classification and routing block 218 will be described in detail in the following sections.

In the case of VPC service, the VPCs are ordered and leased from a service provider. The VPC configuration associated with the VPC service ordered is then placed in the configuration database 124 of the communication device 100 (FIG. 1). The VPC may be manually configured, or automatically configured using protocols such as ILMI. In response to the VPCs ordered, the queuing module 200 sets up level-1 flows for the VPCs. Flow classification and policy definitions determine how to identify one protocol stream from another, in addition to the QoS parameters required to support each stream. As data units are received on an interface for a class where a flow has not been established, a level-2 flow is requested from a fly-by flow admission control block 232 via a forwarding application program interface ("API") block 230 based upon the flow classification and policy definition. When a level-2 flow is requested, it is requested with a corresponding level-1 Flow ID that was created by the user configuration. The flow classification and routing block 218 use the configuration to determine routes and the set of level-1 flows available to make level-2 flows. Each level-2 flow created is assigned a level-2 Flow ID and a VCC. The VCC assignment allows flows to be multiplexed at the cell level (e.g., one cell from one flow followed by one cell from another flow).

In the case of VCC service, the VCCs are also ordered and leased from the service provider. The VCC configuration associated with the VCC service ordered is then placed in the configuration database 124 of the communication device 100 (FIG. 1). This can be manually, or automatically configured using protocols such as ILMI. In response to the VCCs ordered, the queuing module 200 sets up level-1 flows for the VCCs. Flow classification and policy definitions determine how to identify one protocol stream from another and determine the QoS parameters required to support each stream. As data units are received on an interface for a class where a flow has not been established, a level-2 flow is requested from the fly-by flow admission control block 232 via the forwarding API block 230 based upon the flow classification and policy definition. When a level-2 flow is requested, it is requested with a corresponding level-1 Flow ID that was created by the user configuration. The flow classification and routing block 218 uses the configuration to determine routes and the set of level-1 flows available to make level-2 flows. Each level-2 flow created is assigned a Flow ID. VCC service does not assign VCCs to flows as in the VPC service. However, data structures for flow state machines are created and initialized as in VPC service. With VCC service, flows are multiplexed at the packet level (e.g., when a flow is chosen for output service, all segments of the packet are transmitted in consecutive succession before another flow is serviced).

CONTROL SEGMENT

In the control segment, a connection management task 226 (e.g., an ATM management task) and a physical interface management task 228 are provided and run with/on the operating system 122 (FIG. 1). These tasks operate in the non-interrupt code space and communicate with the resource manager 222 by way of an API using the supervision message system 220. The API is used to pass messages (e.g., LMI, OAM, and signaling information) between the tasks and the WAN interface. The resource manager 222 sends requests for establishing, terminating, and modifying connections to the connection management task 226. The connection management task 226 responds to such requests directing the resource manager 222 to install, de-install, or modify the connections. The physical layer management task 228 communicates with the resource manager 222, notifying the latter of the (up/down) status of physical ports. The LMI, OAM, and signaling messages passed back to the supervision message system 220 from the connection management task 226 are sent directly to a buffer management block 234 for queuing in queues 236, and subsequent output.

The resource manager 222 handles the installation, de-installation, and modification of flows. This includes handling and generating resource management data to control the data rate for flow controlled connections such as, for example, ATM ABR. The resource manager 222 is also responsible for mapping class and policy definitions for the flows. Such class and policy definitions include resource requirements (e.g., bandwidth, peak rate limits, buffer delay, and jitter). Moreover, the resource manager 222 assigns pre-established VCCs and flow state machine data structures for VPC service due to the activation/deactivation of the flows (e.g., layer-3 to layer-7 protocol flows such as IP). Activation of flows occurs upon data unit arrivals, or signaling protocols (e.g., ATM SVC Signaling or Resource ReserVation Protocol "RSVP") that require a flow be established. Deactivation of flows occurs upon timeouts for flows (e.g., data unit arrivals not received for a predetermined amount of time), or by signaling protocols such as ATM SVC signaling and RSVP. The resource manager 222 is coupled to a flow database 224 which contains the current resource state (e.g., available bandwidth for allocation, available buffers for allocation, etc.).

In addition, the flow database 224 includes other parameters and state variables including, but not limited or restricted to, Flow ID used to map, for example, a layer-3 protocol (e.g., IP) classified flow into a level-2 VCC, connection shaping parameters and state (e.g., QoS parameters such as peak and sustained bandwidth, maximum queuing delay, maximum burst size, etc.), and connection scheduling parameters and state (e.g., sustained rate). The resource manager 222 allocates resources for flows and keeps track of remaining resources using the flow database 224. It determines whether resources can be allocated to flows and reclaims resources for flows no longer active.

In the case of ATM, an example of a resource request to the resource manager 222 may include the following:

(1) ATM connection index;
(2) ATM connection type (VPC or VCC);
(3) Virtual path identifier ("VPI");
(4) Virtual connection identifier ("VCI");
(5) Traffic contract (e.g., ABR, UBR, VBR, CBR, GFR);
(6) Peak cell rate ("PCR");
(7) Sustained cell rate ("SCR");
(8) Minimum cell rate ("MCR");
(9) Maximum cell burst size ("MBS");
(10) Associated routing virtual interface number;
(11) Associated UNI number;
(12) Buffer allocation (e.g., number of buffers);
(13) ATM VCC endpoint function assignment (e.g., AAL5, AAL2, ILMI);
(14) Encapsulation Type (e.g., 1483, null, etc.);
(15) Hierarchy Level-1 assignment (VPC, VCC);
(16) Hierarchy Level-2 assignment (VCC, AAL2VCC, AAL5 packet mode VCC); and
(17) Range of VCIs available within VPC (for VPC service).

The connection management task 226, upon initialization, interfaces with the operating system 122 running on the communication device 100 and reads the configuration information in the connection database 124 to install the user configurations (FIG. 1). If there is a VPC service to be configured, the connection management task 226 issues a request to the resource manager block 222 to install a level-1 flow (and requests a QoS) for the VPC. The resource manager block 222 then establishes a level-1 flow and assigns resources to the flow. The resource manager block 222 then sends a deny or confirmation message and a Flow ID back to the connection management task block 226. A deny message indicates that there are insufficient resources available if the request indicated to deny in the case of insufficient resources. A confirmation message indicates that there were either sufficient resources and a flow assigned, or insufficient resources (e.g., less than requested resources) and a flow assigned. A similar protocol is performed for VCC service. The connection management task block 226 then notifies the flow classification and routing block 218 of the set of VPCs and VCCs (level-1 flows) that are set up to be used by sending the Flow IDs of the VPCs and VCCs to the same.

Transmit Segment

In the transmit segment, the forwarding API block 230 passes data units, Flow IDs, and/or requests for assignment of Flow IDs and QoS from the flow classification and routing block 218 to a fly-by flow admission control block 232. The fly-by flow admission control block 232 performs admission control for data unit arrivals for which there is no assigned flow. This is required due to the connectionless nature of many protocol layers (e.g., IP). For support of packet classifications, the fly-by flow admission control block 230 interacts with the flow classification and routing block 218 to map protocol layer flows to level-1 or level-2 flows.

At initialization, the connection management task 226 creates pre-configured level-2 flows between the source and destination node on which it can map a layer protocol flow to the level-2 flow (e.g., mapping a new layer-3 protocol such as IP, or a layer-2 protocol such as frame relay or PPP to a level-2 flow). Each pre-configured level-2 flow is initially setup without any QoS parameters assigned to it.

The flow classification and routing block 218 passes data units and their corresponding Flow IDs to the fly-by flow admission control block 232 for existing flows. The fly-by flow admission control block 232 then forwards the data units to the buffer management block 234 for queuing.

To establish a new flow, the flow classification and routing block 218 passes a resource request to the fly-by flow admission block 232 for the QoS parameters for a new flow. QoS parameters include, but are not limited or restricted to, peak rate, sustained rate, delay, jitter, and maximum burst size. In response to the resource request, the fly-by flow block 232 attempts to acquire resources for the flow by sending a request to the resource manager 222. The resource manager 222 determines whether there are sufficient resources such as bandwidth, buffers, connection identifiers, delay bounded routes, etc. to meet the desired QoS associated with the flow, as indicated by the policy associated with the class. If sufficient resources exist, the fly-by flow admission block 232 is notified to acquire a level-2 flow out of a pool of available level-2 flows that have not been assigned to protocol layers (e.g., layer-2 or layer-3 classified flows). The fly-by flow admission block 232 then assigns to the level-2 flow, the QoS parameters requested by the flow classification and routing block 218 in the QoS request. The data unit is then forwarded to the buffer management block 234 for queuing. Consequently, the level-2 flow is active and able to accept and queue data units. If there are insufficient resources, the flow may be denied or accepted on an "all-others" flow (e.g., lower priority flow) as predetermined by user configuration control.

When flow classification and routing block 218 wishes to terminate the protocol layer flow, it requests the resource manager 222 to deactivate the level-2 flow. All resources that were used by the level-2 flow are returned to the resource pool and the flow is deactivated. When deactivated, the level-2 flow is no longer available to be used until it is reassigned to a new layer-3 or layer-2 flow.

The fly-by flow admission control block 232 has the advantage over explicit out-of-band flow establishment procedures such as ATM signaling or RSVP in that the data unit is not delayed by the out-of-band flow establishment process that requires communication between networking devices. Thus, with the fly-by flow admission block 232, the first data unit to establish a flow is not delayed and can be immediately forwarded to the network port. This makes applications such as Voice over IP a reality in the WAN.

Resources assigned to level-1 flows can be partitioned for purposes of limiting access. The sum of the resource partitions is equal to the resource assignment to the level-1 flow. For example, a level-1 flow may have two resource partitions, one for agency A and one for agency B (e.g., for separate LAN networks). Through flow classification, data units can be identified as being members of agency A or B. Thus, when a new data unit stream is identified, the new flow is created from the resource partition assigned to that classification type. In this way, agency A can be limited in the amount of resources that are drawn from the level-1 flow so as not to block resources from being allocated to flows belonging to agency B. Likewise, agency B has its own resource partition to draw from as not to block agency A.

Once a flow has been established, the buffer-management block 234 determines whether the queue has sufficient space for the data unit. If not, the data unit is discarded. If so, the data unit is queued in the data unit queues 236 associated with the flow. A queue is assigned to each flow. The queue operates as a FIFO and can accept packet, frames, and cells.

Queues/buffers are allocated for each VPC, VCC, or UNI. This is used to prevent connections from depleting the buffer pool thus blocking other connections from being able to queue data for transmission. It can also be used to bound the queuing delay for a flow. A flow only uses the buffers allocated to the associated VPC, VCC, or UNI. If a flow depletes its buffer allocation, even though there are available buffers in the system, the data unit is discarded. For cases where there are a relatively large number of connections and/or interfaces, buffer allocation can be configured so that the buffers are over-allocated. This results in more buffers being available on a statistical basis with a chance that a flow might not at times be able to use its allocation. For example, 10,000 buffers are allocated to a UNI. As long as a majority of the connections are idle or have not used their entire buffer allocation, active connections can queue more packets and cells than if their buffer allocation were limited to 100 buffers.

The queues 236 are coupled to a two-tiered hierarchical shaper/scheduler block 238, having a hierarchy level-1 shaper/scheduler and a hierarchy level-2 shaper/scheduler, that selects a flow for service. If the packet arrives into a non-empty queue, the flow has already been scheduled and no further action is required. That is, once a packet is queued, the flow associated with the packet is sent to the shaper/scheduler block 238 for shaping and scheduling. The shaper/scheduler block 238 is invoked periodically to service the queues 236. When a flow is selected for output, the associated output adaptation processing assigned to the flow is performed and the data is delivered to an output port. For example, for ATM, the output function is the ATM encapsulation layer block 240 which applies the RFC 1483 header to the packet. The packet is then passed to the ATM adaptation layer block 242 which segments packets into cells and outputs the cells.

Figure 3A:
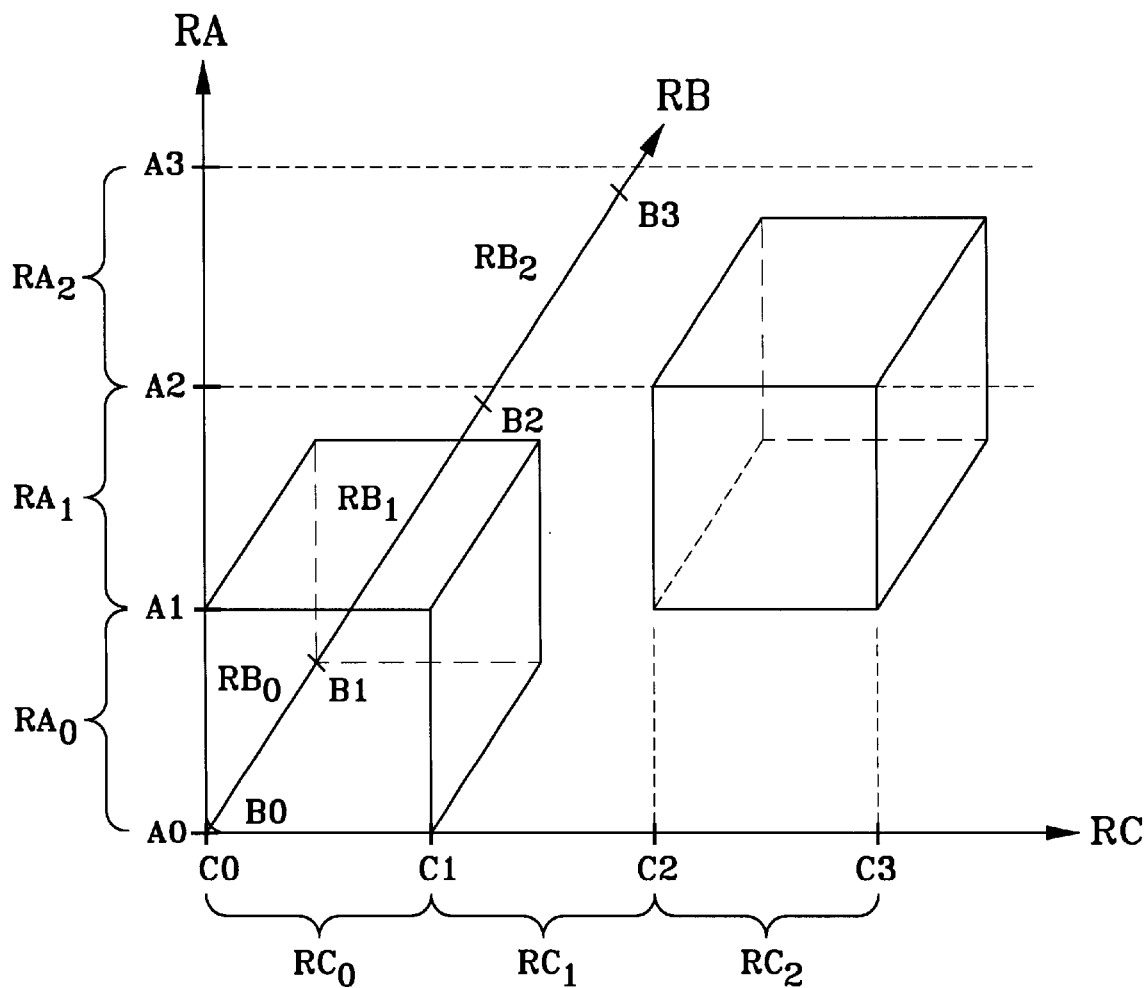
FIG. 3A illustrates one embodiment of the classification technique provided in accordance with the principles of the invention.
Figure 3B:
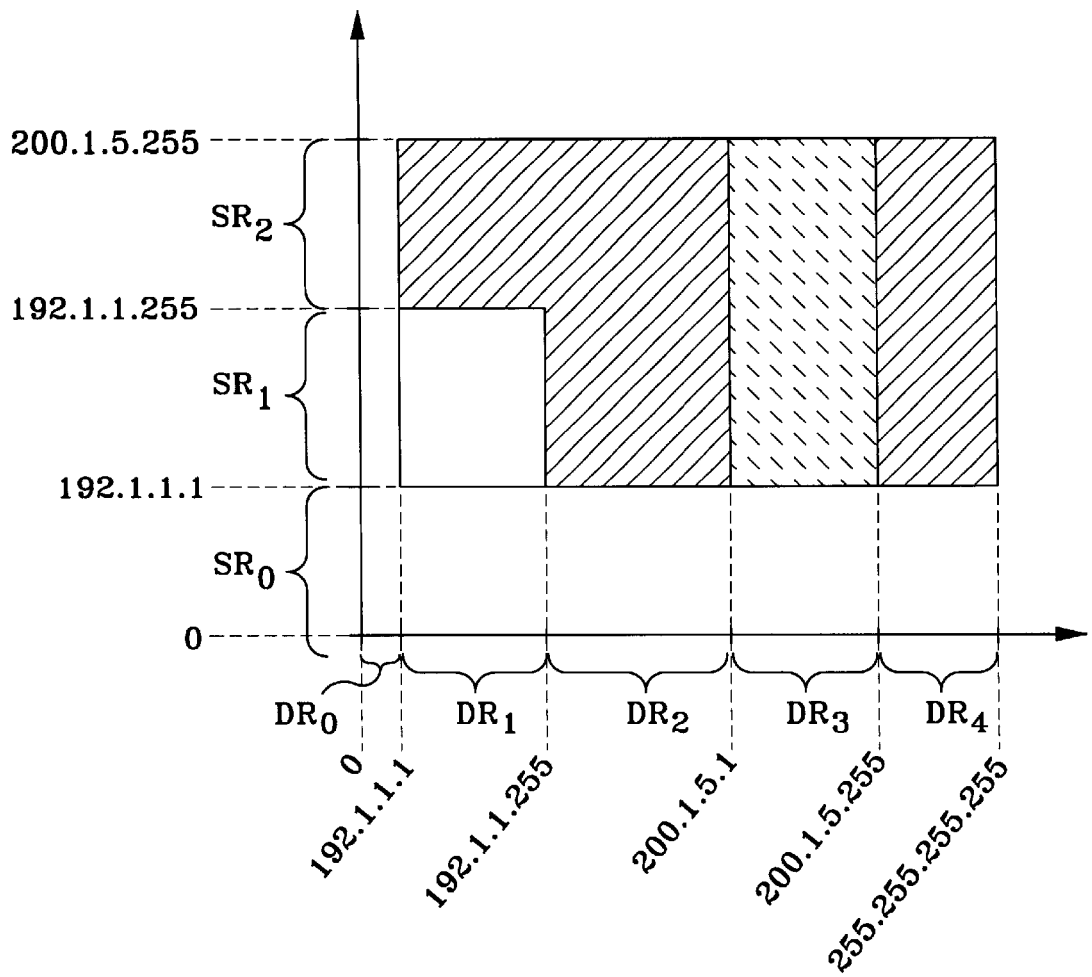
FIG. 3B illustrates one example of Axis Preprocessing technique provided in accordance with the principles of the invention.
Figure 4:
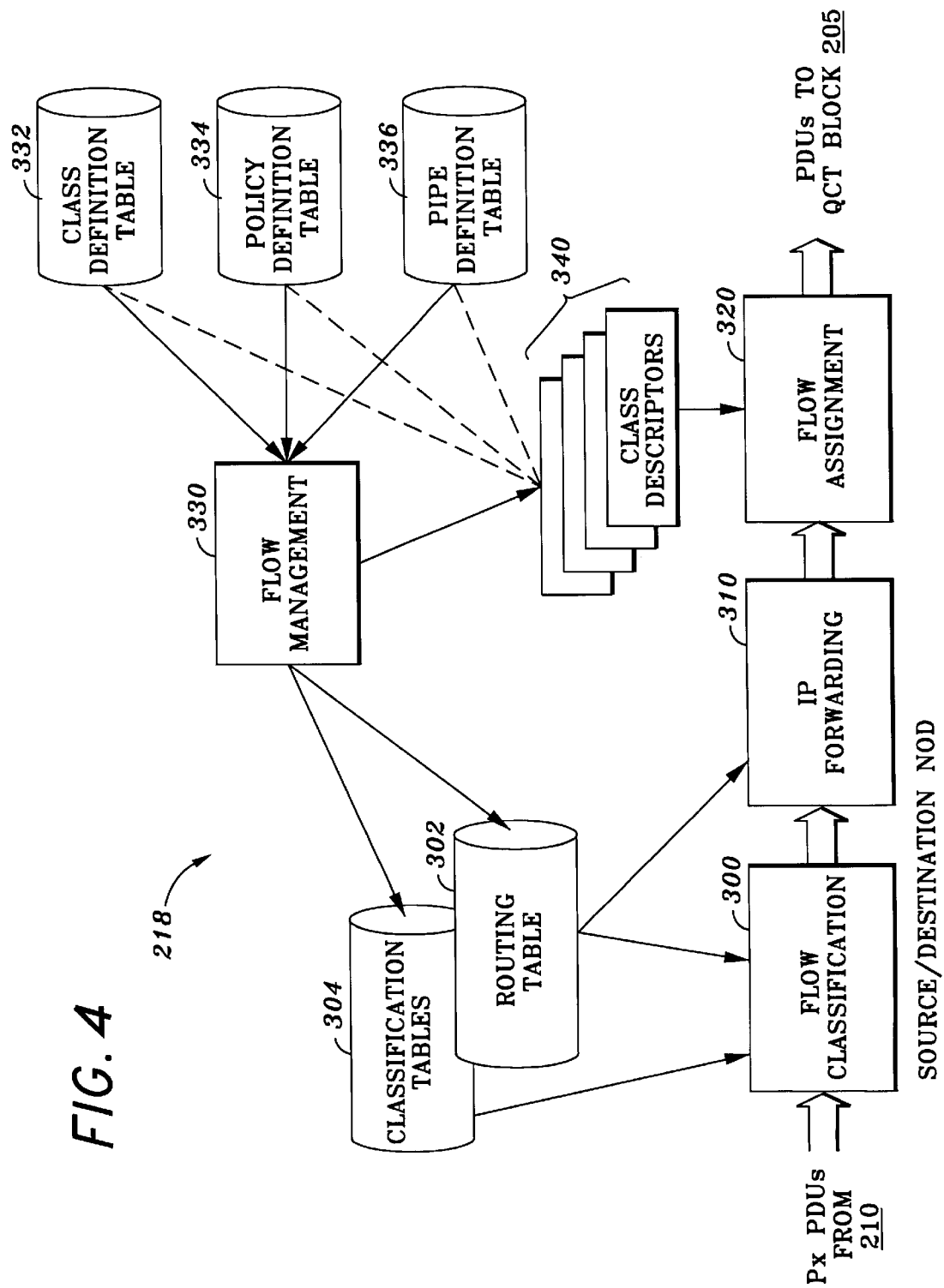
FIG. 4 illustrates details of functional blocks within the flow classification and routing block 218 according to one embodiment of the invention.

FIG. 3A illustrates one embodiment of the classification technique provided in accordance with the principles of the invention, while FIG. 3B illustrates one example of Axis Preprocessing technique provided in accordance with the principles of the invention. FIG. 4 illustrates details of functional blocks within the flow classification and routing block 218 according to one embodiment of the invention. With reference to FIG. 4, the flow classification and routing block 218 comprises a flow classification block 300, an IP forwarding block 310, a flow assignment block 320, and a flow management block 330. In one embodiment, the data (e.g., the tables) used for classification and searching may be stored in internal memory, e.g., in data RAM 110. In alternate embodiments, the data may be stored in external memory 120. The flow classification block 300 uses a series of searches to assign each incoming PDU to a "class." The class assignment determines the quality of service (QoS) for a particular flow. One embodiment of the process and system for processing the flow based upon class assignments is described in co-pending U.S. patent application Ser. No. 09/261,039, entitled "Admission Control, Queue Management and Shaping/Scheduling for Flows," filed Mar. 2, 1999 concurrently herewith, and assigned to the assignee of the present invention, the contents of which are incorporated herein by reference. In one embodiment, the first search locates class information for both source and destination IP addresses. This search also locates next hop routing information for the destination address, which is passed to the IP forwarding block 310. Other searches are used to locate classing information for UDP/TCP ports, protocol byte and DS/protocol byte values. The classing information from each search is added together to form a "sum of products" value which represents the PDU's class. This final value is found in a binary range tree, which returns the class descriptor. Details of the binary range tree search are described in FIGS. 5A, 5B and the accompanying text.

The classification technique of the present invention first defines the class available for classifying each PDU. The classes may be defined in terms of: Source IP Address Ranges, Destination IP Address Ranges, DS/TOS byte ranges (Differentiated Services/Type of Service), Well known applications (destination port number for registered applications), Protocol (UDP, TCP, etc), Destination Port Number ranges or Source Port Number Ranges. It is understood that the classes may be defined by other parameters, or by a greater or lesser number of parameters. For present discussion purposes, and as shown in FIG. 3A, two classes are defined based on three parameters, RA, RB and RC. For example, parameters RA may be divided into three ranges, RA0, RA1 and RA2; parameters RB may be divided into three ranges, RB0, RB1, RB2; and parameters RC may be divided into three ranges RC0, RC1 and RC2. It is understood that each parameter may include a greater or fewer number of ranges. Each range has a plurality of values, each of which is associated with particular information and data related to the flow.

Preprocessing begins by "projecting" each upper and lower limit value of the ranges from each class, onto an "axis". In the example shown in FIG. 3A, the upper and lower limit value of range RA0 are A1 and A0 respectively; and the upper and lower limit value of range RA1 are A2 and A1 respectively. Various points may be similarly located on each axis representing the ranges, as shown in FIG. 3A.

Since there are three ranges, RA, RB and RC, each set of three points, one on each axis is used to create ranges, and then each range is numbered from 0 to NA (for range RA), from 0 to NB (for range RB) and from 0 to NC (for range RC), where NA, NB and NC are positive integers. The axis with the largest number of ranges becomes the least significant axis (LSA). In the present example, RC is the least significant axis, since it has 3 ranges, while RA has one range and RB has 2 ranges.

The range number on each axis becomes the "tag" value for the axis' search process. Before saving the "tag" value into the search tree, it is first preshifted so when logically OR'ed with the "tag" values from the other searches, a unique result is formulated. The amount of the preshift depends on whether the axis is the LSA or not. If the axis is the LSA, it is not preshifted, so it's "tag" value gets placed not the least significant bits of the result, thus creating the maximum number of ranges (since the LSA is the axis with the maximum number of ranges in it). If the axis is not the LSA, it is shifted by an amount so that "$2^{shiftcount} \geq$ maximum number of ranges in the LSA."

In the example shown in FIG. 3A, the range values for Class 1 and 2 are as follows:

| Range Value on Axis | Class 1 | Class 2 |
|---|---|---|
| RA | RA0 | RA1 |
| RB | RB0 | RB1 |
| RC | RC0 | RC2 |

Each axis' tag values are numbered in sequential order starting at 0, so the tag values associated with each range value would be:

| Axis | Class 1 | Class 2 |
|---|---|---|
| RA | 0 | 1 or binary 01 |
| RB | 0 | 1 or binary 01 |
| RC | 0 | 2 or binary 10 |

Since axis RC has the most number of ranges, it becomes the LSA, and its values thus are not preshifted. The axis' are sorted by their range count values, so the order of these three axis, from least to most significant, becomes:

| RC | Least significant axis (LSA) |
|---|---|
| RA | |
| RB | Most significant |

Since axis RC has 3 range/tag values, axis RA values must be preshifted by an amount equal to or greater than 3. Since this is a binary shift, the possible shift values are 1, 2, 4, 8, etc. which correspond to $2^n$ values where 'n' is the shift amount. So, axis RA's tag values would be preshifted by 2 bits ($2^2=4$).

Axis RB's tag values must be preshifted by an amount equal to or greater than the shift amount of axis RC, plus the total number of ranges on RA, which is $2^2+2=6$. So, axis RB's tag values would be shifted by 3 bits ($2^3=8$).

So, the resulting preshifted values would be:

| Axis | Class 1 | Class 2 |
|---|---|---|
| RA | 0 | 4 or binary 100 |
| RB | 0 | 8 or binary 1000 |
| RC | 0 | 2 or binary 10 |

Now, suppose a PDU is received which has values which fall into the following ranges:

value 1 from PDU is within range RA0.
value 2 from PDU is within range RB1.
value 3 from PDU is within range RC2.

The preshifted tag values for each of these are then OR'ed together: 0 OR 8 OR 2=10

The value 10 is then found in the Final Classification Binary Range Tree which yields the "class" designation for the PDU, which in the case of FIG. 3A, would be class 2.

The preshifted values are stored in the corresponding nodes of a Binary Range Tree (see FIGS. 5A, 5B and accompanying text), so when a value is found within the range, the range's preshifted "tag" value is located. Since the values are preshifted, the only additional processing required is to OR them together to form a final "tag" value. This final "tag" value is finally found in a Binary Range Tree which results in the actual "class" for the PDU.

FIG. 3B illustrates a simple example of the classification system provided in accordance with the principles of the invention. In this example, the classification system is based only on source and destination IP addresses. As shown in FIG. 3B, three classes are defined as follows:

Class 1=Any PDU from IP addresses 192.1.1.1 to 2.1.5.255, and destined for any IP address in the range 192.1.1.1 to 255.255.255.255.

Class 2=Any PDU from IP addresses 192.1.1.1 to 200.1.5.255, and destined for any IP address in the range 200.1.5.1 to 200.1.5.255.

Class 3=Any PDU from IP addresses 192.1.1.1 to 192.1.1.255, and destined for any IP address in the range 192.1.1.1 to 192.1.1.255.

Preprocessing begins by "projecting" each upper and lower limit value, from each class, onto an imaginary "axis," as illustrated at the top of FIG. 3B. For the 3 class definitions, this results in the following "points" on each "axis."

On the "Source IP Axis:"
Point 1=0.0.0.0 (this is always assumed to be there)
Point 2=192.1.1.1 (lower value from all 3 classes)
Point 3=192.1.1.255 (upper value from class 3)
Point 4=200.1.5.255 (upper value from all three classes)
Point 5=255.255.255.255 (this is always assumed to be there)
On the "Destination IP Axis:"
Point 1=0.0.0.0 (this is always assumed to be there)
Point 2=192.1.1.1 (lower value from classes 1 & 3)
Point 3=192.1.1.255 (upper value from class 3)
Point 4=200.1.5.1 (lower value from class 2)
Point 4=200.1.5.255 (upper value from class 2)
Point 5=255.255.255.255 (upper value from class 1)

Each set of two points on each axis is used to create ranges, and then each range is numbered form 0 to n. The following ranges are produced from the above example:
On the "Source IP Axis:"
Range 0=0.0.0.0 to 192.1.1.0
Range 1=192.1.1.1 to 192.1.1.255
Range 2=192.1.2.0 to 200.1.5.255
Range 3=200.1.6.0 to 255.255.255.255
On the "Destination IP Axis:"
Range 0=0.0.0.0 to 192.1.1.0
Range 1=192.1.1.1 to 192.1.1.255
Range 2=192.1.2.0. to 200.1.5.0
Range 3=200.1.5.1. to 200.1.5.255
Range 4=200.1.6.0 to 255.255.255.255

The axis with the largest number of ranges becomes the least significant axis (LSA). In this example, the LSA would be the "Destination IP Axis" since it has 5 ranges compared to only 4 on the "Source IP Axis."

The range number on each axis become the "tag" value for the axis' search algorithm. Before saving the "tag" value into the search tree, it is first preshifted so when logically ORed with the "tag" values from the other searches, a unique result is formulated. The amount of the preshift depends on whether the axis is the LSA or not. If the axis is the LSA, it is not preshifted, so its "tag" value gets placed not the least significant bits of the result, thus creating the maximum number of ranges (since the LSA is the axis with the maximum number of ranges in it). If the axis is not the LSA, it is shifted by an amount so that "$2^{shiftcount} \geq$ maximum number of ranges in the LSA." Since the LSA in this example has 5 ranges, the other axis' "tag" values are shift by 3 bits ($2^3$=8 which is greater than 5 ranges in the LSA).

In particular, each axis' tag values (except for the LSA) are shifted by an amount equal to the maximum number of bits required to represent the maximum tag value for each axis which has lower significance than the axis in question. In the above example, the LSA (the Destination IP Address Axis) has a maximum tag value of 4 (where 0, 1, 2, 3, 4 are the values of each tag). A "4" requires 3 bits to encode (binary 100=decimal 4). As a result, each tag value for the non-LSA (the Source IP Address Axis) is shifted left by 3 bits. This is the same as multiplying each tag value by $2^3$=8.

The preshifted values are stored in the corresponding nodes of the Binary Range Tree, so when a value is found within the range, the range's preshifted "tag" value is located. Since the values are preshifted, the only additional processing required is to OR them together to form a final "tag" value. This final "tag" value is finally found in a Binary Range Tree which results in the actual "class" for the PDU. Thus, in the present example, Source IP tag values 0, 1, 2 and 3 become 0, 8, 16 and 24 respectively, which are then stored in the classification tables.

If a PDU is classified so that its Source IP address matches Class 3, the value read from the Source IP table would be 8 (tag value of 1 shifted by 3 bits). If the same PDU's Destination IP address matches class 2, the value read from the Destination IP table would be 3 (tag value is 3, which is not shifted because the destination axis is the LSA). These two values are combined to form 8+3=11. The value 11 is then found in the final classification binary range tree.

With reference to FIG. 4, the IP forwarding block 310 uses the next hop information resulting from the PDU's classification to rout the PDU. The routed PDU, along with the class definition, LIP list and network address information, is passed to the flow assignment block 320.

The flow assignment block 320 utilizes the class descriptor found by the flow classification block 300 to locate the outbound flow ID for a PDU. The PDU is provided to the forwarding API block 230 in the Queue Control/Transmit (QCT) module 205, along with its flow ID, LIF list and class definition information. If the flow ID is valid the QCT module 205 queues the PDU and returns a "successful" indication. If the flow ID was either invalid (dropped by the QCT module 205) or nonexistent (i.e., it is a new flow), the QCT module 205 will attempt to assign a flow ID. If successful, the new flow ID is returned is returned to the flow assignment block, which then saves the information in the original class descriptor. If a flow ID could not be assigned, the QCT module 205 retries transmission using the "all others" class.

The flow management block 330 generates and updates a set of tables (indexed by protocol, DS byte and port values) to be used by the flow classification block 300. In one embodiment, the set of tables include a class definition table 332, a policy definition table 384, and a pipe definition table 336. The tables 332, 334 and 336 facilitate efficient assignment of an incoming PDU to a "class". The tables 332, 334 and 336 also assign a class descriptor value to each PDU, which is passed in the buffer descriptor. The flow management block 330 also creates class descriptors 340 to be used by the flow assignment block 320. The class descriptors 340 are referenced by the classification tables 304. The flow assignment block 330 uses the class descriptors 340 to locate an outbound flow ID for a PDU.

The QCT module 205 sends "events" such as bandwidth changes, to the flow management block 330. These events may cause the class descriptors 340 to be rebuilt due to changes in policies, as described in detail in the following sections. The flow management block 330 also handles traffic management requests.

More particularly, the flow classification block 300 processes up to a predetermined number of PDUs in parallel, assigning each to a class. For discussion purposes, the predetermined number of PDUs is 4, although it is understood that a greater or lesser number of PDUs may be processed in parallel in accordance with the principles of the present invention. The flow classification block also obtains the destination routing information, which is saved in a buffer descriptor for later use by the IP forwarding block 310. If the flow classification block 300 determines that a PDU must be discarded, it is marked in the buffer descriptor. The flow assignment block 320 will subsequently discard the PDU. The resulting class information is stored in the buffer descriptor, which the flow assignment block uses to assign the PDU to a specific flow.

Each type of traffic to be identified by the flow classification block 300 must be defined by a class definition. A class definition will allow a system administrator to specify the IP address range, protocol values, DS byte values and UDP/TCP port values to be identified in forwarded IP PDUs, which then becomes part of the class. In one embodiment, there are 1024 different classes. One or more of the following criteria can be combined to form a template for the PDUs associated with a class:

Source IP Address Ranges
Destination IP Address Range
DS/TOS byte range (Differentiated Services/Type of Service)
Well known application (destination port number for registered applications)
Protocol (UDP, TCP, etc)
Source Port Number Range
Destination Port Number Range By default, an "all others" class is defined which will match any incoming PDU and use a "best effort" policy for delivery. User defined classes will essentially be included in the "all others" class.

The class definition table 332 allows a class of IP PDUs to be defined. Table 1 illustrates one example of the table objects and their usage. In one embodiment, the table is instanced by the ClassDefinitionIndex.

The policy definition table 334 associates a class definition with a pipe definition. In one embodiment, there are 2048 different policies. One or more of the following criteria can be combined to form a policy which will associate a pipe definition with a class definition:

Outgoing priority value for queuing
Outgoing DS byte value
Bandwidth allowed for each flow within the class
Discard priority Table 2 illustrates an example of the Policy Definition Table, which is instanced by PolicyDefinitionIndex.

The pipe definition table 336 creates a slice of the available circuit's bandwidth (e.g., in the case of ATM, the VCC), which can be mapped to classes of incoming data. A single pipe definition causes a single flow aggregate to be created within QCT module's 205's level 2 scheduler. In one embodiment, there are 1024 different pipe definitions. The following criteria is defined for each pipe:

Logical interface
WAN circuit identifier (or 0 for a LAN interface)
Percentage of bandwidth to assign to the pipe
Maximum queuing delay allowed on pipe.

Table 3 illustrates one embodiment of the pipe definition table 336. The table is instanced by PipeDefinitionlndex.

To classify PDUs, several searches are performed. The first search utilities a Routing Table 302 to locate classing information based on source and destination IP addresses. In one embodiment, the search engine for this search is based on the Binary Range Tree search process of the present invention, as discussed in detail in the following sections. In one embodiment, the routing table 302 stores routing information. In an alternate embodiment, the routing table 302 stores both routing and classing information. In one embodiment, the routing table 302 is shared between the flow classification and IP forwarding blocks 300 and 320.

The other searches locate classing information based on UDP/TCP ports, DS and protocol bytes. In one embodiment, these engines utilize an "array look-up" search technique, as known by one of skill in the art, to conduct the other searches. The flow classification tables 304 are used by the "array look-up" search technique to locate classing information based on UDP/TCP ports and DS/protocol bytes.

The PDUs classified by the flow classification block 300 are forwarded, along with their associated routing information, to the IP forwarding block 310. The IP forwarding block 310 identifies an outbound LIF for each received PDU and then passes this information to the flow assignment block 320. The PDUs are then forwarded to the QCT module 205. As described earlier, if the flow assignment block 320 determines that a PDU must be discarded, it is marked in the buffer descriptor. The flow assignment block 320 will subsequently discard the PDU thus marked.

Figure 5A:
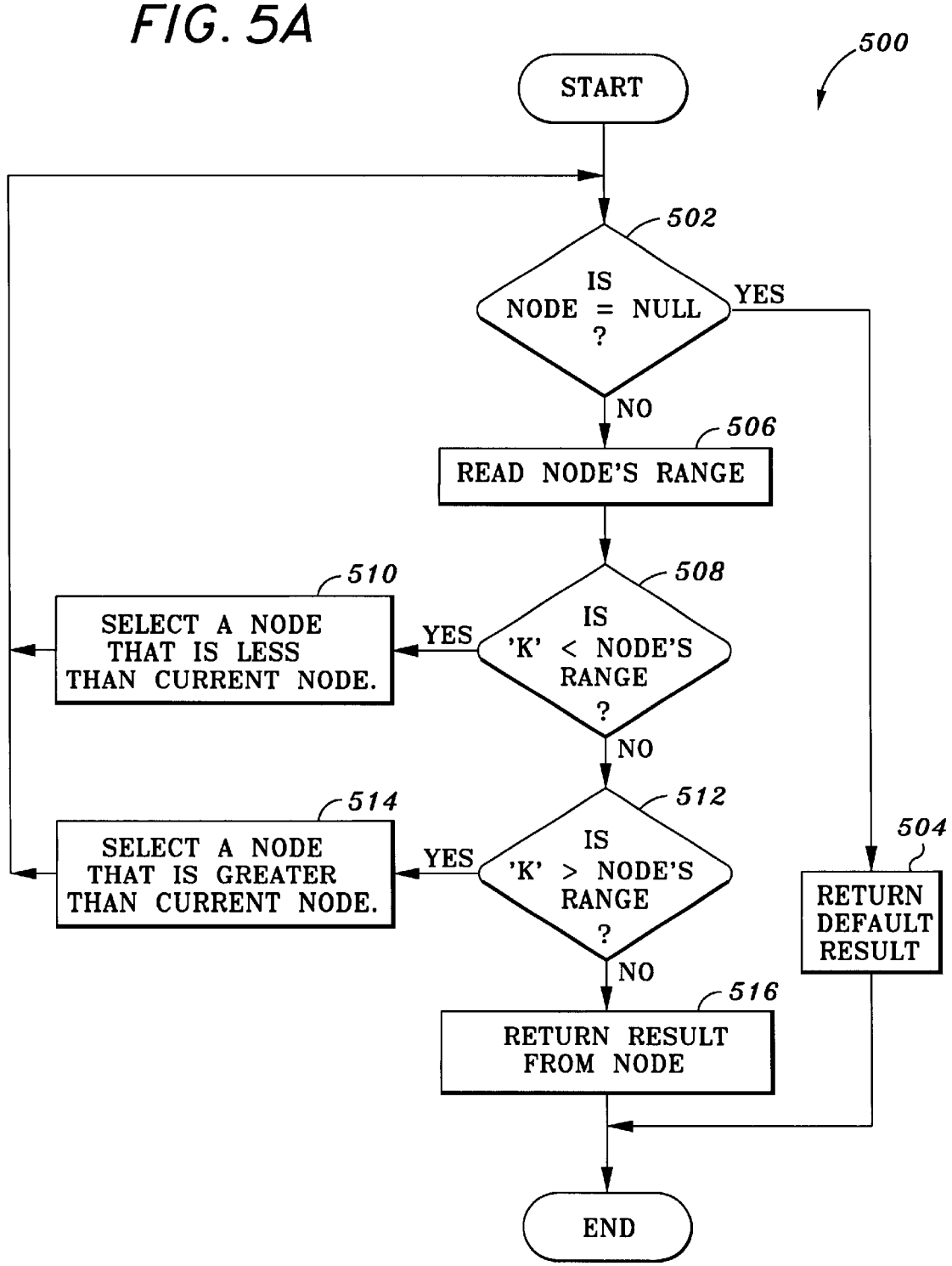
FIG. 5A illustrates one embodiment of a search process flow provided in accordance with the principles of the present invention.

FIG. 5A illustrates one embodiment of a search process flow provided in accordance with the principles of the present invention. The search process flow 500 facilitates searching of data corresponding to various parameter ranges of incoming PDUs. An example of the ranges to be searched includes the IP Address of the incoming PDUs. The data associated with the IP address ranges are stored within the CPU's 105's internal memory, such as in cache memory. Data outside of the IP address ranges may be stored in SRAM 120 or other in other memory locations external to the CPU 105.

The search process involves determining if the value k associated with the incoming PDU is located in any one of the stored ranges located in the CPU's 105's internal memory. If so, data associated with the stored ranges may be efficiently retrieved. Each set of stored ranges is located in a node of a tree, with the search progressing from a root or upper level node to a secondary or lower level nodes. The search process flow 500 operates as follows. Beginning from a start state, the process 500 proceeds to decision block 502, where it determines if the node is null (i.e., contains no data). If so, the process 500 proceeds to process block 504, where it returns a default result. In one embodiment, the default result is to assign the PDU having the value k to an "all others class". In this case, best efforts will be used to transport the corresponding PDU. If the node is not null, the process 500 proceeds to read the node's range, as shown in process block 506. The process 500 then advances to process block 508, where it queries if k is less than the node's range. If so, the process 500 proceeds to process block 510, where it selects to proceed to a node having a range that is less than the current node. The process 500 then returns to decision block 502. Otherwise, the process 500 proceeds to decision block 512, where it determines if k is greater than the node's range. If so, the process 500 proceeds to process block 514, where it selects to proceed to a node having a range that is greater than the current node. The process 500 then proceeds to decision block 502. Otherwise, the process 500 proceeds to process block 516, where it returns the result from the node in which k is found. For example, data associated with k, as found within the node, is returned. The process 500 is then terminated.

Figure 5B:
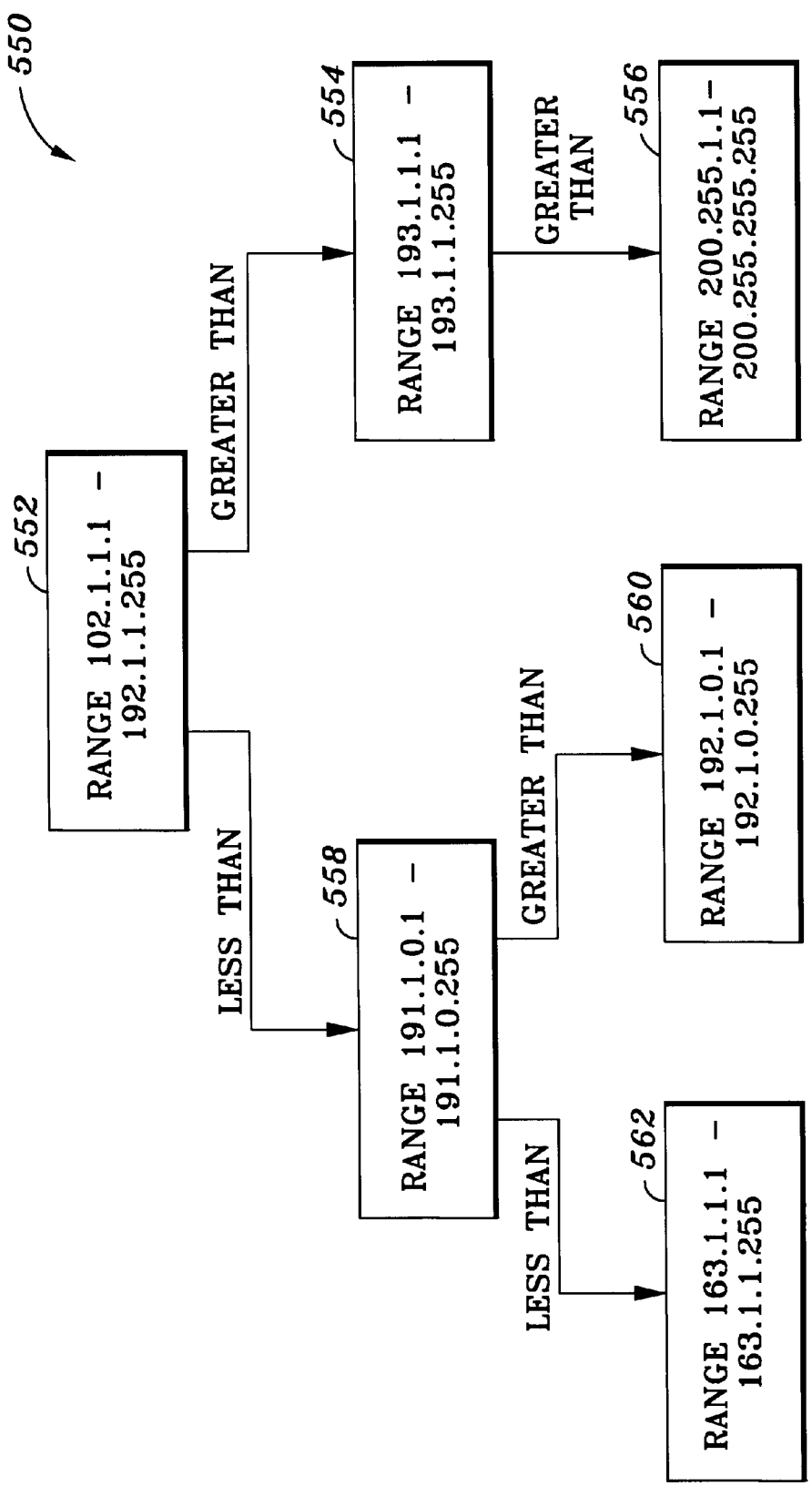
FIG. 5B is a diagram that illustrates one example of the search process of FIG. 5A.

FIG. 5B is a diagram that illustrates one example of the search process of FIG. 5A. In this example, the value k (such as the IP address ranges) and the corresponding data are stored in internal memory of CPU 105. These IP address ranges include range 192.1.1.1–192.1.1.255, 193.1.1.1–193.1.1.255, 200.255.1.1–200.255.255.255, 191.1.0.1–191.1.0.255, 192.1.0.1–192.1.0.255 and 163.1.1.1–163.1.1.255. The process 550 begins the search by determining if the IP address of the incoming PDU is located in range 192.1.1.1–192.1.1.255 (block 552). If so, the data corresponding to the IP address located in range 192.1.1.1–192.1.1.255 is retrieved. Otherwise, the process 550 proceeds to search in ranges that are both greater than and less than range 192.1.1.1–192.1.1.255.

For example, the process 550 may proceed to search in the range 193.1.1.1–193.1.1.255 (block 554). If the IP address is found to be in that range, the corresponding data is retrieved. Otherwise, the process 550 proceeds to search in the range 200.255.255.255. If the IP address is found in the range 200.255.255.255, the corresponding data is retrieved. Otherwise, a default search result is returned.

The process 550 may also proceed to search in the range 191.1.0.1–191.1.0.255 (block 558). If the IP address is found to be in that range, the corresponding data is retrieved. Otherwise, the process 550 proceeds to search in ranges that are both greater than or less than that of range 191.1.0.1–191.1.0.255. For instance, the process 550 may search in the range 192.1.0.1–192.1.0.255. If the IP address is found to be in that range, the corresponding data is retrieved. Otherwise, the process 550 returns a default search result. The process 550 may also search in the range 163.1.1.1–163.1.1.255. Similarly, if the IP address is found to be in that range, the corresponding data is retrieved. Otherwise, the process 550 returns a default search result.

In the example of FIG. 5B, a binary range search tree that is 3 levels deep is discussed. It is understood that any number of levels that are greater or less than that may be implemented for searching purposes. It has been determined that binary range searches of up to 6 levels may be implemented and stored in the internal memory of a processor such as cache memory, while providing efficient searching. This aspect of the invention thus facilitates efficient searching and identification of incoming data while maintaining the worst case and average case search times deterministic and within the bounds required by the application.

The present invention thus provides a classification system and method by implementing Axis Preprocessing in combination with a Binary Range Tree searching technique. The Binary Range Tree searching technique allows large ranges of contiguous values to be search using a minimal number of tree "nodes", while the Axis Preprocessing technique assures that the maximum number of contiguous ranges is generated in the final "class" search step.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

TABLE 1

| Object | Type | Permissions | Description |
|---|---|---|---|
| ClassDefinitionIndex | Unsigned Long | Read Only | The index value for this Class Definition (1–1024) |
| ClassDefinitionAlias | Octet String | Read/Write | An alias to assign to this class |
| ClassDefinitionParentClassID | Unsigned Long | Read/Write | Parent class definition if using a hierarchy of classes. |
| ClassDefinitionFlowType | Enum | Read/Write | The type of flow . . . NORMAL, CHANNELED, DIFFSERVINGRESS, DIFFSERVNODE, DIFFSERVEGRESS, or DELETE. Set to DELETE to remove this Class Definition from the table. |
| ClassDefinitionSourceIPMask | IP address | Read/Write | The value to mask each source IP address with before checking its range. (not valid for DIFFSERVNODE or DIFFSERVEGRESS types) |
| ClassDefinitionDestIPMask | IP address | Read/Write | The value to mask each destination IP address with before checking its range . . . (not valid for DIFFSERVNODE or DIFFSERVEGRESS types) |
| ClassDefinitionSourceIPLowerBound | IP address | Read/Write | The first source IP which is within the range . . . (not valid for DIFFSERVNODE or DIFFSERVEGRESS types) |
| ClassDefinitionSourceIPUpperBound | IP address | Read/Write | The last source IP which is within the range . . . (not valid for DIFFSERVNODE or DIFFSERVEGRESS types) |
| ClassDefinitionDestIPLowerBound | IP address | Read/Write | The first destination IP which is within the range . . . (not valid for DIFFSERVNODE or DIFFSERVEGRESS types) |
| ClassDefinitionDestIPUpperBound | IP address | Read/Write | The last destination IP which is within the range. . . (not valid for DIFFSERVNODE or DIFFSERVEGRESS types) |
| ClassDefinitionDSLowerBound | Unsigned Byte | Read/Write | The first DS/TOS byte value which is within range. |
| ClassDefinitionDSUpperBound | Unsigned Byte | Read/Write | The last DS/TOS byte value which is within range. (not valid for DIFFSERVNODE or DIFFSERVEGRESS types) |
| ClassDefinitionWellKnownApplication | Enum | Read/Write | The "well known application" value (see 4.1.1), of 0xff if not used . . . (not valid for DIFFSERVNODE or DIFFSERVEGRESS types) |
| ClassDefinitionProtocol | Enum | Read/Write | (Valid if ClassDefinitionWellKnownApplication is not used) . . . TCP, UDP, TCPUDP, rfc1700 defined protocols, or ANY . . . (not valid for DIFFSERVNODE or DIFFSERVEGRESS types) |
| ClassDefinitionSourcePortLowerBound | Unsigned Short | Read/Write | (Valid if ClassDefinitionWellKnownApplication is not used) . . . The first source port value which is within range . . . (not valid for DIFFSERVNODE or DIFFSERVEGRESS types) |
| ClassDefinitionSourcePortUpperBound | Unsigned Short | Read/Write | (Valid if ClassDefinitionWellKnownApplication is not used) . . . The last source port value which is within range . . . (not valid for DIFFSERVNODE or DIFFSERVEGRESS types) |
| ClassDefinitionDestPortLowerBound | Unsigned Short | Read/Write | (Valid if ClassDefinitionWellKnownApplication is not used) . . . The first destination port value which is within range . . . (not valid for DIFFSERVNODE or DIFFSERVEGRESS types) |
| ClassDefinitionDestPortUpperBound | Unsigned Short | Read/Write | (Valid if ClassDefinitionWellKnownApplication is not used) . . . The last destination port value which is within range . . . (not valid for DIFFSERVNODE or DIFFSERVEGRESS types) |
| ClassDefinitionSLAMonitorRate | Unsigned Short | Read/Write | The interval (in seconds) between SLA monitoring. A value of 0 disables SLA monitoring for this class. |
| ClassDefinitionSLAAlarmRate | Unsigned Long | Read/Write | The minimum interval (in seconds) between SLA alarms. |

TABLE 1-continued

| Object | Type | Permissions | Description |
|---|---|---|---|
| ClassDefinitionSLAAlarmThreshold | Unsigned Long | Read/Write | The number of alarm conditions which must occur before an actual alarm is generated. |
| ClassDefinitionLIFAgingTime | Unsigned Long | Read/Write | The number of milliseconds to use as an aging time for Flow ID information saved for a LIF. This aging time is also used for classification information which is automatically created for a channelized flow. |

TABLE 2

| Object | Type | Permissions | Description |
|---|---|---|---|
| PolicyDefinitionIndex | Unsigned Long | Read Only | The index value for this Policy Definition (1–1024). |
| PolicyDefinitionAlias | Octect String | Read/Write | An alias to assign to this policy |
| PolicyDefinitionType | Enum | Read/Write | NORMAL, DIFFSERVINGRESS, DIFFSERVNODE, DIFFSERVEGRESS, DISCARD, or DELETE. Set to DELETE to remove this Policy Definition. |
| PolicyDefinitionLIF | Unsigned Long | Read Only | The logical interface this relates to. |
| PolicyDefinitionStartTime | Time of Day | Read/Write | The time this policy comes into effect. |
| PolicyDefinitionEndTime | Time of Day | Read/Write | The time this policy goes out of effect. |
| PolicyDefinitionDayofWeek | Unsigned Byte | Read/Write | Bit flags corresponding to each day of the week . . . (Bits 0–6 = Monday–Sunday). |
| PolicyDefinitionPipeID | Unsigned Long | Read/Write | The Pipe to associate with this Policy. |
| PolicyDefinitionClassID | Unsigned Byte | Read/Write | The Class to associate with this Policy. |
| PolicyDefinitionChannelBandwidth | Unsigned Long | Read/Write | The bandwidth allowed for each flow over this Class/Policy. Only valid is PolicyDefinitionChannelized is set TRUE. |
| PolicyDefinitionChannelized | Boolean | Read/Write | Set TRUE if this Policy defines channelized flows over the specified Pipe. This causes each new flow to be given a unique "slice" of the available bandwidth, as defined by PolicyDefinitionChannelBandwidth. If FALSE, then all flows use the Pipe's bandwidth on a first-come-first-served basis. |
| PolicyDefinitionOutboundDSValue | Unsigned byte | Read/Write | The DS byte value to set in outbound PDUs, or NA if no replacement is to be performed. (valid only is set to DIFFSERV). |
| PolicyDefinitionPriority | Unsigned byte | Read/Write | The relative priority of PDUs using this Policy with respect to other Policies. |
| PolicyDefinitionEvent | Enum | Read/Write | STATIC - the Policy is always in effect unless superceded by another. The Policy becomes the default. TIME - the Policy goes into effect and goes out of effect based on the Time and Day values specified. REDUCEDBW - the Policy goes into effect if the Pipe's bandwidth is reduced by the physical interface. INCREASEDBW - the Policy goes into effect if the Pipe's bandwidth is increased by the physical interface. |

TABLE 3

| Object | Type | Permissions | Description |
|---|---|---|---|
| PipeDefinitionIndex | Unsigned Long | Read Only | The index value for this Pipe Definition (1–1024). |
| PipeDefinitionType | Enum | Read/Write | VALID - the Pipe is valid. DELETE - to remove the Pipe Definition. |
| PipeDefinitionAlias | Octect String | Read/Write | An alias to assign to this Pipe. |

TABLE 3-continued

| Object | Type | Permissions | Description |
| --- | --- | --- | --- |
| PipeDefinitionLIF | Unsigned Long | Read/Write | The logical interface this Pipe is using. |
| PipeDefinitionCircuitID | Unsigned Long | Read/Write | The ID of the circuit this Pipe is using. |
| PipeDefinitionBandwidth | Unsigned Long | Read/Write | The amount of the circuit's bandwidth to assign to this Pipe. If the value is <= 100, it is considered to be a "percentage" value. If the value is > 100, it is considered to be a "bits per sec" value. |
| PipeDefinitionDelay | Unsigned Long | Read/Write | The maximum allowable queuing delay for this Pipe. |

What is claimed is:

1. A method for classifying information received by a communications device, comprising:

(a) defining a first parameter having a first parameter range and a second parameter range, and a second parameter having a third parameter range and a fourth parameter range;

(b) defining a first class having one of said first parameter and said second parameter ranges, and one of said third and said fourth parameter ranges;

(c) defining a second class having another one of said first parameter and said second parameter ranges, and another one of said third and said fourth parameter ranges;

(d) receiving information having a first parameter value and a second parameter value;

(e) determining if said first parameter value is within one of said first and second parameter ranges and determining if said second parameter value is within one of said third and fourth parameter ranges, if so, classifying said information into one of said first and second classes based on said first parameter value and said second parameter value, otherwise classifying said information as a default class; and (f) generating an output value representative of said classification.

2. The method of claim 1, wherein the first and the second parameter ranges are the same.

3. The method of claim 1, wherein the third and fourth parameter ranges are the same.

4. The method of claim 1, further comprising:
providing a predetermined quality of service for processing said information based on said classification.

5. The method of claim 1, further comprising, prior to (d):

(c.1) allocating a value to each of said first, second, third and fourth parameter ranges;

(c.2) determining a least significant parameter based on the number of parameter ranges;

(c.3) shifting the values of each of said first, second, third and fourth parameter ranges that are not determined to be associated with said least significant parameter, by a predetermined amount;

(c.4) adding said values of said first and second parameter ranges to provide a first output value, and adding said values of said second and third parameter ranges to provide a second output value;

(c.5) providing said first output value as a first class tag value and said second output value as a second class tag value.

6. The method of claim 4, wherein (e) further comprises:
assigning a class tag value to the received information.

7. The method of claim 5, further comprising:
providing a predetermined quality of service for processing the information based on said class tag value.

8. A computer program product comprising:

a computer usable medium having computer program code embodied therein for searching for information in a processing unit, the computer program product having:

(a) computer readable program code for defining a first parameter having a first parameter range and a second parameter range, and a second parameter having a third parameter range and a fourth parameter range, for defining a first class having one of said first parameter and said second parameter ranges, and one of said third and said fourth parameter ranges, and for defining a second class having another one of said first parameter and said second parameter ranges, and another one of said third and said fourth parameter ranges;

(b) computer readable program code for receiving information having a first parameter value and a second parameter value;

(c) computer readable program code for determining if said first parameter value is within one of said first and second parameter ranges and determining if said second parameter value is within one of said third and fourth parameter ranges, if so, classifying said information into one of said first and second classes based on said first parameter value and said second parameter value, otherwise classifying said information as a default class; and (d) computer readable program code for generating an output value representative of said classification.

9. The computer program product of claim 8, wherein the first and the second parameter ranges are the same.

10. The computer program product of claim 8, wherein the third and the fourth parameter ranges are the same.

11. The computer program product of claim 8, wherein said computer readable code further for providing a predetermined quality of service for processing said information based on said classification.

12. The computer program product of claim 8, wherein said computer readable code further for (a.1) allocating a value to each of said first, second, third and fourth parameter ranges;

(a.2) determining a least significant parameter based on the number of parameter ranges;

(a.3) shifting the values of each of said first, second, third and fourth parameter ranges that are not determined to be associated with said least significant parameter, by a predetermined amount;

(a.4) adding said values of said first and second parameter ranges to provide a first output value, and adding said values of said second and third parameter ranges to provide a second output value;

(a.5) providing said first output value as a first class tag value and said second output value as a second class tag value.

13. The computer program product of claim 11, wherein said computer program product further for assigning a class tag value to the received information.

14. The computer program product of claim 13, wherein said computer program product further for providing a predetermined quality of service for processing the information based on said class tag value.

15. A system comprising:

a processor having a processing unit;

a memory module coupled to said processor, said memory module having instruction sequences to cause said processor to:

(a) define a first parameter having a first parameter range and a second parameter range, and a second parameter having a third parameter range and a fourth parameter range;

(b) define a first class having one of said first parameter and said second parameter ranges, and one of said third and said fourth parameter ranges;

(c) define a second class having another one of said first parameter and said second parameter ranges, and another one of said third and said fourth parameter ranges;

(d) receive information having a first parameter value and a second parameter value;

(g) determine if said first parameter value is within one of said first and second parameter ranges and determining if said second parameter value is within one of said third and fourth parameter ranges, if so, classifying said information into one of said first and second classes based on said first parameter value and said second parameter value, otherwise classifying said information as a default class; and (h) generate an output value representative of said classification.

16. The system of claim 15, wherein the first and the second parameter ranges are the same.

17. The system of claim 15, wherein the third and the fourth parameter ranges are the same.

18. The system of claim 15, wherein said instruction sequences further cause said processor to provide a predetermined quality of service for processing said information based on said classification.

19. The system of claim 15, wherein said instruction sequences further cause said processor to, prior to act (d):

(c.1) allocating a value to each of said first, second, third and fourth parameter ranges;

(c.2) determining a least significant parameter based on the number of parameter ranges;

(c.3) shifting the values of each of said first, second, third and fourth parameter ranges that are not determined to be associated with said least significant parameter, by a predetermined amount;

(c.4) adding said values of said first and second parameter ranges to provide a first output value, and adding said values of said second and third parameter ranges to provide a second output value;

(c.5) providing said first output value as a first class tag value and said second output value as a second class tag value.

20. The system of claim 19, wherein (e) further comprises: assigning a class tag value to the received information.

21. The system of claim 20, wherein the instruction sequences further cause said processor to provide a predetermined quality of service for processing the information based on said class tag value.

* * * * *